Sept. 29, 1970  R. A. RAVENEL  3,530,648
COMBINED AIR-FILTER AND INDUCTION SILENCER
Filed March 7, 1968  3 Sheets-Sheet 1

United States Patent Office 3,530,648
Patented Sept. 29, 1970

3,530,648
COMBINED AIR-FILTER AND INDUCTION SILENCER
Raymond A. Ravenel, Sceaux, France, assignor to Société Anonyme André Citroën, Paris, France
Filed Mar. 7, 1968, Ser. No. 711,257
Claims priority, application France, Apr. 18, 1967, 103,170
Int. Cl. B01d 27/08
U.S. Cl. 55—276                              5 Claims

ABSTRACT OF THE DISCLOSURE

A combined air-filter and induction silencer for machines sucking a gaseous fluid, such as compressors, internal combustion engines, etc. The combined air-filter and induction silencer according to this invention comprises in the direction of flow of the induction stream at least a first chamber and a second chamber interconnected by a coupling duct, and said second or downstream chamber has a relatively high inherent resonance frequency, higher than the inherent frequency of the first or upstream chamber, and said coupling duct interconnecting said chambers is arranged with a view to introduce a greater pressure drop in the direction opposite to the normal direction of flow of the incoming gaseous stream.

BACKGROUND OF THE INVENTION

The present invention relates to a combined air-filter and induction silencer for machines sucking a gaseous fluid, such as compressors, internal combustion engines, etc.

Induction silencers are already known which act at the same time as air-filters and comprise two chambers connected in series and a filter element disposed at the inlet of the first or upstream chamber in the direction of flow of the gaseous stream.

However, when silencers of this type are connected to the induction side of an internal combustion engine they display a serious inconvenience. In fact, when reading the curve recording the variation in the specific fuel consumption as a function of the engine speed, a fuel surge or extravagance is observed in the engine speed range whereat the silencer's chambers are resonant.

SUMMARY OF THE INVENTION

It is an essential object of this invention to avoid this inconvenience while improving the cylinder filling rate and therefore the power output of the machine equipped with this silencer and efficiently reducing induction noises.

To this end, the combined air-filter and induction silencer according to this invention for machines sucking a gaseous fluid, such as compressors, internal combustion engines, etc., comprising in the direction of flow of the induction stream at least a first chamber and a second chamber interconnected by a coupling duct, is characterized in that said second or downstream chamber has a relatively high inherent resonance frequency, higher than the inherent frequency of the first or upstream chamber, and that said coupling duct interconnecting said chambers is arranged with a view to introduce a greater pressure drop in the direction opposite to the normal direction of flow of the incoming gaseous stream.

The combined induction air-filter and silencer according to this invention is characterized by several advantageous features. Firstly, when it is used in the induction system of an internal combustion engine, it permits of extending the nearly linear portion of the engine power output curve towards the high-speed range, thus improving the cylinder filling at these high speeds. This increase in the engine power output, due to the use of a second chamber having a relatively higher inherent resonance frequency, is obtained while maintaining the specific fuel consumption curve of the engine close to the ideal curve within the zone of range of normal engine speeds. In fact, the complete system has two inherent frequencies that are offset outside the speed range of the machine which is contemplated for normal operation.

The system according to this invention is also adapted to act as an induction silencer of which the noise weakening curve is cancelled for each one of the inherent resonance frequencies of the system. In the case of an engine having a noise level increasing with speed, this system provides a substantially constant and maximum noise weakening in the high-speed range.

BRIEF DESCRIPTION OF THE DRAWING

In order to afford a clearer understanding of this invention and of the manner in which the same may be carried out in practice, a typical form of embodiment thereof will now be described by way of example with reference to the accompanying drawings, in which.

DESCRIPTION OF THE PREFERRED EMBODIMENT

Figure 1:
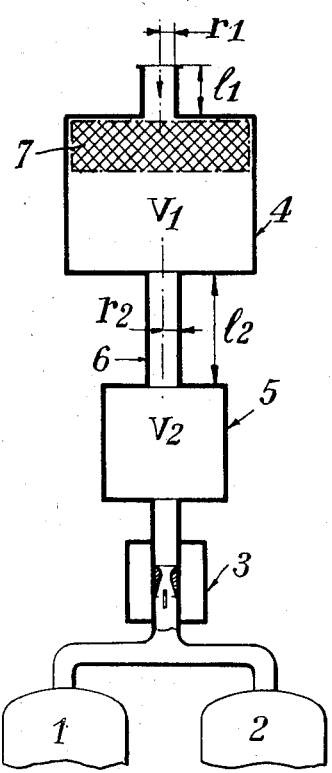
FIG. 1 is a diagram showing the principle of the system constituting an induction silencer and an air filter for a two-cylinder internal combustion engine.

Reference will first be made to FIG. 1 illustrating the general principle of the system constituting the combined induction silencer and air filter according to this invention, adapted to a two-cylinder internal combustion engine or to an engine having an even number of cylinders for each pair of cylinders of which the cycle of each cylinder is offset by 360° on the crankshaft with respect to the other cylinder. This system is disposed upstream of the carburetor 3 and comprises in succession, in the direction of flow of the induction air stream, a first chamber 4 and a second chamber 5 interconnected by a duct 6. A filter element 7 is disposed in the first chamber 4, in the vicinity of the inlet port thereof.

Considering the diagram of a two-cylinder engine in which the cycle of each cylinder is shifted by 360° about the crankshaft axis in relation to the other cylinder, these two cylinders 1 and 2 being fed from a common carburetor 3 through a branched manifold, as shown in FIG. 1, it will be seen that the power output of this engine can be improved by disposing upstream of the carburetor a resonant chamber 5 having a relatively high inherent frequency. It will also be seen that this chamber has an optimum capacity value whereat the maximum power output is obtained; this optimum capacity has an inherent frequency $f_2$ of the order of 75 hertz, corresponding to an engine speed of 4,500 r.p.m.'s.

Having thus obtained the optimum engine power output by properly selecting the optimum capacity of chamber 5, it will be seen that the use of chamber 5 alone upstream of carburetor 3 is attended (see FIG. 2) by a fuel surge or extravagance $a_1$ shown in dot-and-dash line in the curve plotting the variation in the specific fuel consumption $c_s$ as a function of engine speed $n$ (in r.p.m.) or of the frequency $f$ (hertz), this anomaly being particularly detrimental because it lies in a zone corresponding to very frequently used engine speeds (i.e., in the range between the lower limit speed $N_1$ and the upper limit speed $N_2$).

According to this invention, to eliminate this fuel consumption surge $a_1$ there is connected to the aforesaid chamber 5 and at the upstream end thereof another chamber 4 having an inherent resonance frequency lower than that of chamber 5. Thus, for example, chamber 4 may have a resonance frequency $f_1$ of the order of 50 hertz corresponding for example to an engine speed of 3,000 r.p.m.

The resonance frequencies of chambers or capacities 4 and 5 may be calculated either experimentally or by using the approaching formula proposed by Helmholtz:

$$f = \frac{C}{2\pi}\sqrt{\frac{\pi r^2}{Vl}}$$

or better according to the Rayleigh formula:

$$f = \frac{C}{2}\sqrt{\frac{\pi r^2}{V\left(l + \frac{\pi}{2}r\right)}}$$

wherein $f$ is the resonance frequency, C the speed of sound in air, V the volume of the capacity or chamber, $r$ the radius of the inlet port and $l$ the length of this port. The magnitudes $V_1$, $r_1$ and $l_1$ of the first chamber 4, and $V_2$, $r_2$ and $l_2$ of the second chamber 5 are shown in FIG. 1.

It is proved by calculation that the coupling of two chambers 4 and 5 will modify the inherent frequencies of the system which become the roots $\varphi_1$, $\varphi_2$ of the following equation:

$$f^2 = \frac{1}{2}\left[f_1^2 \frac{V_1+V_2}{V_1} + f_2^2 \pm \sqrt{\left(f_1^2\frac{V_1+V_2}{V_2}+f_2^2\right)^2 - 4f_1^2 f_2^2}\right]$$

Actually, $\varphi_1$ and $\varphi_2$ are approached values which can be determined experimentally.

The coupling of two resonant capacities or chambers 4 and 5 is therefore adapted to space the inherent frequencies from each other; in other words, the system has now two newi nherent resonance frequencies $\varphi_1$, $\varphi_2$ such that $\varphi_1 < f_1 < f_2 < \varphi_2$.

Figure 2:
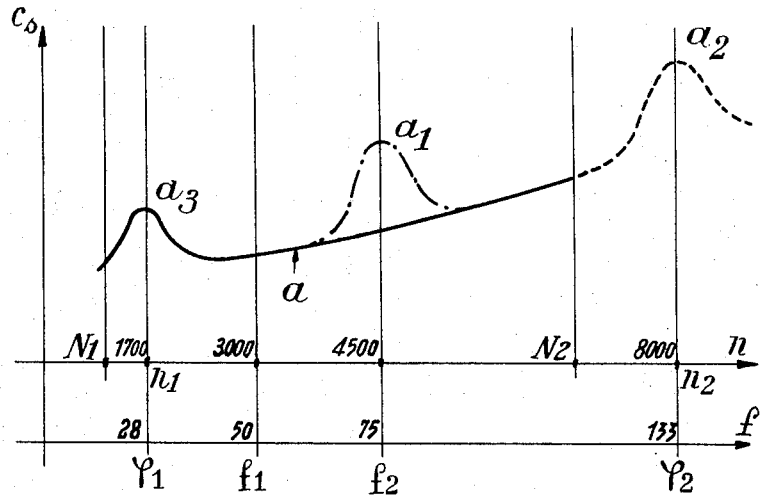
FIG. 2 is a diagram illustrating the variation in specific fuel consumption of the engine as a function of engine speed.

As shown in FIG. 2, the low resonance frequency is now reduced from $f_1 = 50$ Hz. (at 3,000 r.p.m.) to $\varphi_1 = 28$ Hz. (at 1,700 r.p.m.) for example, and the high inherent frequency is increased from $f_2 = 75$ Hz.) at 4,500 r.p.m.) to $\varphi_2 = 133$ Hz. (at 8,000 r.p.m.), that is, beyond the maximum rated or service speed $N_2$ of the engine. Thus, a specific fuel consumption curve (FIG. 2) is obtained which is advantageous throughout the range of normal engine speeds. In fact, it will be seen that the curve $a$ of FIG. 2 comprises a first fuel consumption surge $a_2$ (corresponding to frequency $\varphi_2$, that is, $n_2 = 8,000$ r.p.m.), lying beyond the maximum service speed $N_2$, and another fuel consumption surge $a_3$ corresponding to frequency $\varphi_1$, i.e., to the engine speed of 1,700 r.p.m. This last surge $a_3$ is not particularly critical due to the transitory character of this engine speed and moreover it is attenuated by the specific arrangement of the coupling duct 6 between the chambers 4 and 5. In fact, this duct is so arranged that the loss of pressure introduced thereby is greater in the direction opposite to the normal direction of flow of the incoming air stream. It may consist, for example, of a curved pipe section having a venturi-like inlet, or alternately it may comprise a series of offset cones as described in the French Pat. No. 1,362,526.

This duct 6 providing a higher pressure loss in the counter-current direction causes a reduction in the modulation amplitude at the resonance speed, and therefore a reduction in the factor determining the objectionable fuel surge or extravagance.

Figure 3:
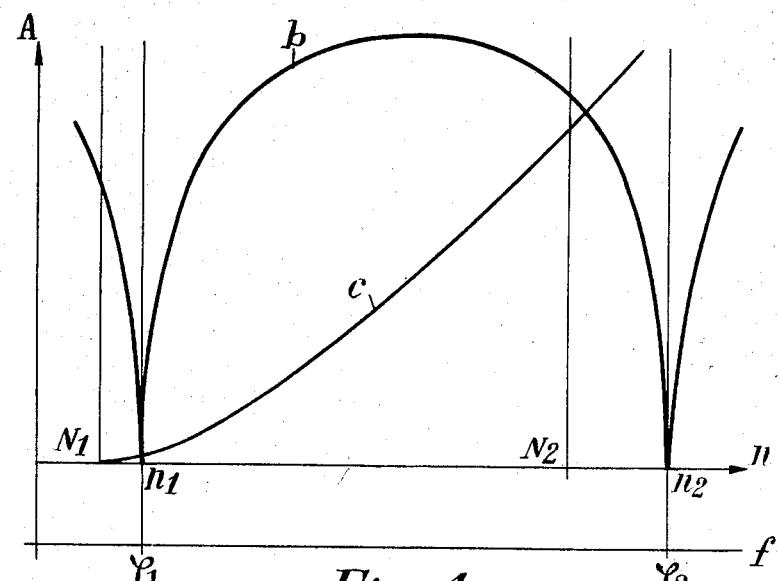
FIG. 3 is a diagram showing the noise damping action of the silencer as a function of engine speed.

As can be seen in FIG. 3 illustrating the variation in the noise weakening A in decibels as a function of engine speed $n$ (or of the frequency $f$), the above-described system acts at the same time as an induction silencer of which the noise weakening curve $b$ is cancelled for each one of the inherent resonance frequencies $\varphi_1$ and $\varphi_2$. In the case of an engine characterized by a noise level increasing as a function of speed (curve $c$), it causes a substantially constant weakening which is maximum at high operating speeds.

The above results may also be obtained by using a greater number, for example three, four or more, of series-connected chambers, instead of two. In this case a system having three, or more than three degrees, of freedom, is obtained which therefore facilitates the solution of the problem consisting in simultaneously obtaining the optimum power output and the optimum fuel consumption. However, in this case cost rapidly becomes a prohibitive factor.

Figure 4:
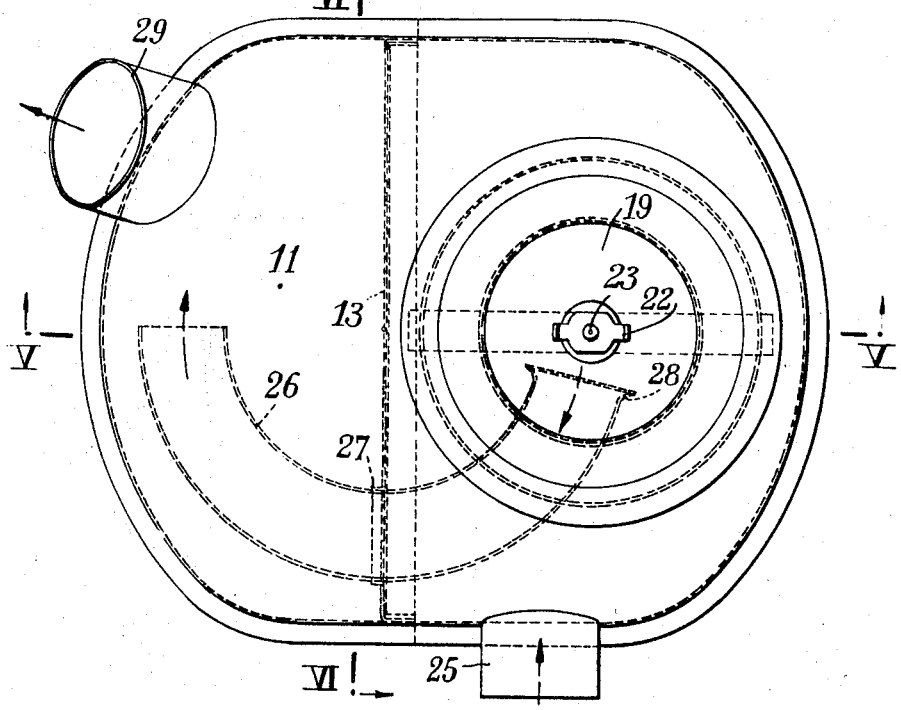
FIG. 4 is a plan view illustrating a typical form of embodiment of the combined air filter and induction silencer of this invention.
Figure 5:
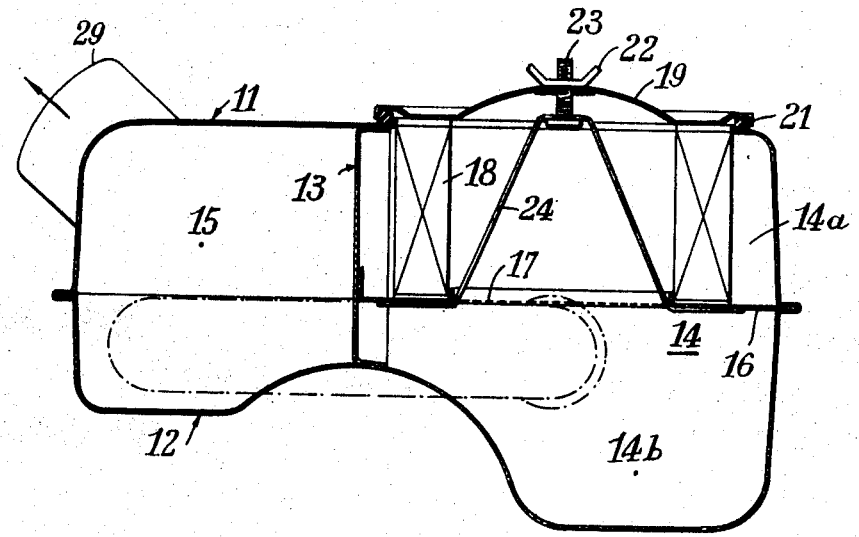
FIG. 5 is a section taken along the line V—V of FIG. 4.
Figure 6:
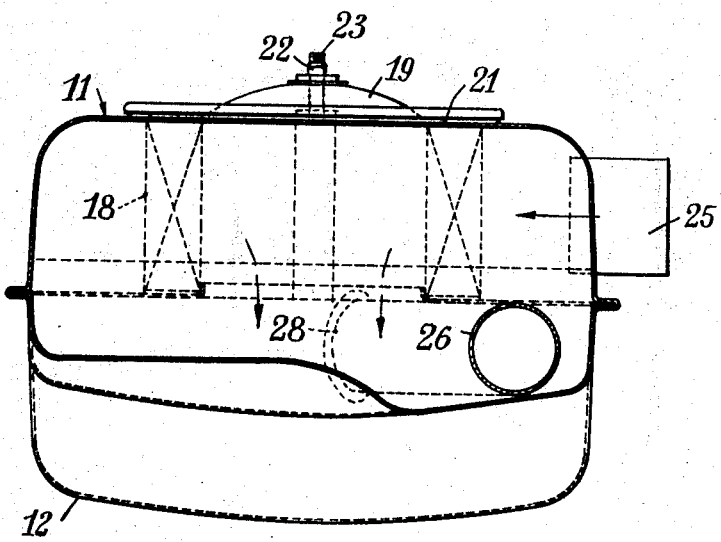
FIG. 6 is a section taken along the line VI—VI of FIG. 4.

Now reference will be made more particularly to FIGS. 4, 5 and 6 of the drawings, which illustrate in detail a specific form of embodiment of a combined air-filter and induction silencer for a two-cylinder internal combustion engine. This system comprises essentially a casing consisting of a pair of shells, i.e. an upper shell 11 and a bottom shell 12, assembled along registering flanges by crimping. A vertical partition 13 divides the inner space of the casing into two chambers, namely an upstream chamber 14 and a downstream chamber 15, in the direction of flow of the gaseous fluid. The upstream chamber 14 is divided in turn into an upper or inlet chamber 14a and a lower chamber 14b by a horizontal partition 16 in which a central orifice 17 of relatively large diameter is formed. A cylindrical filter cartridge 18 is clamped on the partition 16 and surrounds the central orifice 17, by means of a cover 19. This cover 19 is pressed, with the interposition of a sealing gasket 21, against the edge of an aperture formed in the upper face of casing 11. The cover is retained in position and clamped by a nut 22 engaging a screw 23 secured to a strap 24 solid with the partition 16.

An air inlet pipe 25 is welded to the upper shell 11 and opens into the inlet chamber 14a.

A curved coupling duct is provided in the form of a pipe section 26 interconnecting the upstream chamber 14 and the downstream chamber 15. This coupling duct extends through an orifice 27 formed in said vertical partition 13. The coupling duct 26, in this exemplary form of embodiment, is of substantially semi-circular configuration and comprises a venturi-shaped inlet 28.

The path followed by the induction air is shown by the arrows in the figures. Thus, the air penetrating through the inlet pipe 25 into the inlet chamber 14a flows successively through the filter cartridge 18, the orifice 17 and into the lower portion 14b of upstream chamber 14, then through the coupling duct 26, into the downstream chamber 15 from which it eventually emerges and flows towards the engine induction manifold through an outlet pipe 29.

The volumetric capacity of the upstream chamber 14 is greater than that of downstream chamber 15 and therefore the inherent frequency of chamber 14 ($f_1 = 50$ Hz.) is lower than that of downstream chamber 15 ($f_2 = 75$ Hz.), as already explained hereinabove in connection with FIG. 1.

Although the present invention has been described in conjunction with a preferred embodiment, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. A combined air filter and induction silencer for a machine comprising a casing, a vertical partition dividing said casing into an upstream chamber and a downstream chamber, said upstream chamber having a greater volume than said downstream chamber, a horizontal partition dividing said upstream chamber into an inlet chamber and a lower chamber, said horizontal partition having an opening, a filter cartridge in said inlet chamber fitting over said opening, means for securing said filter cartridge in place, an air inlet pipe opening into said inlet chamber, a duct extending through said vertical partition and connecting the interior of said lower chamber with the interior of said downstream chamber, and an outlet pipe connected to said downstream chamber for connecting said downstream chamber with said machine.

2. A combined air filter and induction silencer according to claim 1, in which said duct is curved and leads from a central portion of said lower chamber to a central portion of said downstream chamber.

3. A combined air filter and induction silencer according to claim 2, in which said duct is approximately semicircular.

4. A combined air filter and induction silencer according to claim 1, in which the entrance end of said duct is flared to provide a venturi-shaped inlet.

5. A combined air filter and induction silencer according to claim 1, in which said inlet chamber has an opening above said filter cartridge and said means for securing said filter cartridge in place comprises a cover for said opening.

References Cited

UNITED STATES PATENTS

| 2,214,529 | 7/1969 | Halford. | |
| 2,704,055 | 5/1953 | Downing. | |
| 3,279,560 | 10/1966 | Hubrich | 181—47 |

FOREIGN PATENTS

| 246,583 | 8/1963 | Australia. |
| 1,086,090 | 8/1954 | France. |
| 1,229,592 | 3/1960 | France. |
| 1,233,817 | 3/1960 | France. |
| 1,340,660 | 9/1963 | France. |
| 391,180 | 4/1933 | Great Britain. |
| 779,904 | 7/1957 | Great Britain. |
| 806,925 | 1/1959 | Great Britain. |
| 891,854 | 3/1962 | Great Britain. |

FRANK W. LUTTER, Primary Examiner

B. NOZICK, Assistant Examiner

U.S. Cl. X.R.
55—510; 181—47